United States Patent [19]

Molivadas

[11] 4,358,929
[45] Nov. 16, 1982

[54] SOLAR POWER SYSTEM

[76] Inventor: Stephen Molivadas, 2800 Upton St., NW., Washington, D.C. 20008

[21] Appl. No.: 144,275

[22] Filed: Apr. 28, 1980

Related U.S. Application Data

[63] Continuation-in-part of Ser. No. 457,271, Apr. 2, 1974, Pat. No. 4,211,207, which is a continuation-in-part of Ser. No. 902,950, May 4, 1978.

[51] Int. Cl.$^3$ .............................................. F03G 7/02
[52] U.S. Cl. .................................. 60/641.8; 60/660; 60/667; 126/433
[58] Field of Search ................. 60/660, 667, 664, 641, 60/641.8; 126/433

[56] References Cited

PUBLICATIONS

Yamada, T. *Control of a Vapor Engine* Memoirs of the Defense Academy Japan, vol. XIV, No. 2, pp. 23–39, 6/74.

*Primary Examiner*—Albert W. Davis, Jr.

[57] ABSTRACT

Various control methods and means are disclosed for varying the temperature of vaporization of a solar-powered system so that the instantaneous power delivered by the heat engine of this system, or by a device driven by this engine, is a maximum for given conditions external to the power system, or to the power system and the driven device, respectively, while ensuring that dry saturated vapor, or vapor with a preselected amount of superheat is supplied to the heat engine.

The power system uses a Rankine power cycle whose working fluid is either vaporized in the absorber of a solar collector, or in a heat exchanger by a separate fluid which absorbs heat by flowing through the solar collector absorber.

Also, various methods and means are disclosed for controlling the foregoing separate heat-transfer fluid so that it absorbs sensible and latent heat in the absorber of the solar collector in essentially the same ratio as the power-cycle working fluid absorbs sensible and latent heat from this heat-transfer fluid.

41 Claims, 9 Drawing Figures

SOLAR POWER SYSTEM

RELATED APPLICATION

This application is a continuation-in-part application of my co-pending application Ser. No. 457,271, now U.S. Pat. No. 4,211,307, filed Apr. 2, 1974, entitled "HEATING AND COOLING SYSTEMS," and a continuation-in-part of my co-pending application Ser. No. 902,950, filed May 4, 1978, entitled "SOLAR HEATING SYSTEM".

DESCRIPTION OF THE PRIOR ART

Heat engines powered by conventional sources of energy are controlled:

(a) to maintain the speed of the engine nearly constant under varying loads, or (b) to change the speed of the engine as a function of the load.

The methods employed to accomplish either of these objectives have been limited in the past to adjusting the pressure and flow rate of the working fluid supplied to the engine either by throttling this fluid at a point between the boiler and the engine, or by varying the intensity of the heat source used to power the engine.

In the case where the heat engine is powered by solar heat, the intensity of the heat source cannot be changed by the engine's controls, and therefore the only method available from the prior art for controlling the engine is to throttle the working fluid ahead of the engine. Throttling an engine causes a loss in system efficiency, and this loss is particularly severe in the case of a solar-powered engine because of the properties of solar collectors. Furthermore, neither of the two control objectives given above result in the maximum possible utilization of the solar energy available at the solar collector.

Prior-art solar heat engines either employ no engine controls, or employ throttling-type controls to achieve the same control objectives as engines powered with conventional sources of heat. In either case, the maximum amount of available solar heat during most days is not utilized. It follows that it is desirable to devise a different method and a different objective for controlling solar-powered heat engines.

Prior-art solar-powered systems can be divided into two categories.

In the first category the power cycle working fluid is vaporized in the collector absorber.

In the second category the power cycle fluid is vaporized in a heat exchanger by a separate fluid which absorbs heat by flowing through the collector absorber, and the heat-transfer cycle used to transfer heat from the collector to the heat exchanger is always a single-phase liquid or vapor (usually air) cycle. Two-phase, liquid-vapor, heat-transfer cycles are not used in prior-art solar-powered systems to transfer heat from the solar collector to the heat exchanger, or heat exchangers, in which the power-cycle working fluid is preheated and vaporized, in spite of the fact that such two-phase cycles can provide in many cases a significant improvement in performance.

SUMMARY OF THE INVENTION

Accordingly, a primary object of the present invention is to devise a control objective, and means for achieving this objective, that will cause a solar-powered engine to utilize more of the solar energy available in the radiation intercepted by the solar collector used with the engine.

The control objective is based on the observation made—albeit in different words—in my first cited co-pending application—that the available power from an ideal solar-powered engine attains, for given external conditions, its maximum value at only one temperature of vaporization of the working fluid. The reason for this, as explained in the cited co-pending application—albeit again in different words—is the fact that the rate $Q_{pA}$ at which the working fluid absorbs (directly or indirectly) heat from the radiation intercepted by the solar collector decreases monotonically as the temperature of vaporization increases, whereas the power cycle efficiency $\eta_p$ increases monotonically as this temperature increases. Consequently, the available power $H_{Eng}$ from an ideal engine, which is proportional to the product of these two functions, has a single maximum value for a given set of external conditions. It follows that for an ideal engine to achieve the maximum utilization of solar power, available at the collector, the control objective should be to vary the temperature of vaporization, as a function of external conditions, so that the instantaneous value of the product $(\eta_p \dot{Q}_{pA})$ is a maximum.

All the control methods envisioned for implementing this objective modify the (mechanical) load presented to the engine, and thus usually its speed, so that the temperature of vaporization is, at any given instant, maintained at the value which maximizes a performance quantity related to the available power from an ideal engine for the prevailing external conditions at that instant. The value of most of these control methods is based on the premise that cost-effective solar engines should be designed to carry only part of the design maximum load at low levels of solar radiation; and, in some applications, even at high levels of solar radiation.

Some types of real heat engines, such as rotary-vane expanders, have a nearly-constant efficiency over a wide range of operating conditions. Other types, such as impulse turbines, have an efficiency which is a sensitive function of operating conditions; and, in particular, suffer a considerable loss of efficiency when their speed departs substantially from its design value. In the former case, the foregoing control methods outlined for ideal engines can be used unmodified with no significant loss in the maximum possible utilizable solar energy. In the latter case, to avoid such a loss, a function representing the effect of engine efficiency, as a function of operating conditions, must be instrumented and used in determining modified optimum values of the temperature of vaporization of the working fluid as a function of these conditions.

Whenever the device driven by the solar heat engine is specified, the change in efficiency of this device with operating conditions can be taken into account and the control objective, and the control methods used to implement it, can be modified to maximize the available power from the above device—instead of the available power from the solar heat engine—for the prevailing load presented to this device.

Also, whenever the device driven by the solar heat engine is a part of a system, and both the device and the system are specified, the change in the efficiency of the system, as well as in the efficiency of the driven device, can be taken into account and the control objective, and control methods used to implement it, can be modified to maximize the available power from the system for the prevailing load presented to the system—instead of the available power from the solar heat engine or from the driven device.

I note that in many treatises on power systems a distinction is made between the term "available power" on the one hand and the term "delivered power" or equivalently "power delivered" on the other hand. In the present patent application no such distinction is made between the expression "available power from" and either of the equivalent expressions "delivered power" or "power delivered by", and consequently all three of these expressions are used in this application interchangeably in any context; and, in particular, in the context of the power supplied by a heat engine, an auxiliary source of power, or a mechanical or electrical device, to its load.

Whenever a distinction is not made between the three foregoing control objectives, namely (1) the power delivered by the solar heat engine, (2) the power delivered by the device driven by the solar heat engine, and (3) the power delivered by the system to which this driven device belongs, I shall, in the present application, use the phrase "performance quantity related to the power delivered by the solar-powered heat engine" to denote any one of the foregoing three quantities. In this paragraph, in particular, and in the present application in general, the terms "solar-powered heat engine" and "solar heat engine" are used interchangeably to refer to the same physical entity. Also the abbreviated term "heat engine" is used to refer to this same physical entity in subsequent parts of the present application.

The same control objectives and the same control methods apply both to the case where the working fluid is vaporized directly in the collector fluid passages, and to the case where it is vaporized indirectly in a separate heat-exchanger or heat exchangers, and by a separate and often different fluid which absorbs heat by flowing through the solar collector fluid passages. It should be obvious to those skilled in the art that this statement is true. I shall therefore discuss in the application only one of these cases in detail. Because the former case is discussed in the cited co-pending application, I discuss here the subject matter of this disclosure in the context of the latter case.

Another primary object of the present invention is to describe appropriate means and methods, among those disclosed in my co-pending application Ser. No. 457,271, now U.S. Pat. No. 4,211,207, and in my co-pending application Ser. No. 902,950, for using a two-phase heat transfer cycle to absorb radiant heat in a solar collector and transfer it to the working fluid of a Rankine power cycle.

CLARIFICATION

The phrase "it should be obvious to those skilled in the art" wherever it occurs in the present specification is used as, and is intended to be, an abbreviation of the phrase "it should be obvious to those skilled in the art in view of the teachings in the present specification and the teachings in my two earlier cited co-pending applications".

GENERAL DISCUSSION OF METHODS AND MEANS FOR TRANSFERRING HEAT ABSORBED IN THE SOLAR COLLECTOR TO THE POWER-CYCLE WORKING FLUID

Any prior-art single-phase heat-transfer cycle and associated means and methods can be used. It should also be obvious to those skilled in the art that several of the methods and means described in my co-pending applications Ser. Nos. 457,271 and 902,950 can be used even in the case where the heat-transfer cycle fluid is used to preheat the power-cycle working fluid, and is therefore considerably subcooled at the entrance of the collector-absorber fluid passages.

GENERAL DISCUSSION OF METHODS AND MEANS FOR SUPPLYING DRY SATURATED VAPOR OR VAPOR WITH A PRESELECTED AMOUNT OF SUPERHEAT TO THE SOLAR-POWERED ENGINE

Similarly, those skilled in the art should be able to identify easily which methods and means, among those disclosed in the two cited co-pending applications for controlling the mass flow rate of condensed vapor in the Rankine heat-transfer systems described therein, can also be used to supply dry saturated vapor, or vapor with a preselected amount of superheat, to the solar-powered heat engine. For example, embodiments based on combined claims 36 and 62 of my co-pending application Ser. No. 457,271, now claims 24 and 30 of U.S. Pat. No. 4,211,207, are suitable for supplying dry saturated vapor; and embodiments based on combined claims 28 and 31 of my co-pending application Ser. No. 902,950, now claims 14 and 17 of U.S. Pat. No. 4,211,207 are suitable for supplying superheated vapor.

GENERAL DISCUSSION OF METHODS AND MEANS FOR ESTIMATING THE RATE AT WHICH HEAT IS ABSORBED BY THE FLUID FLOWING THROUGH THE COLLECTOR ABSORBER

The rate $\dot{Q}_{pA}$ at which a fluid, flowing through collector absorbers at a spatially uniform temperature, absorbs heat is determined, at any given time, uniquely—for a given collector array—by the radiation equilibrium temperature $T_{eq}$ defined in my copending application Ser. No. 457,271, now U.S. Pat. No. 4,211,207, and currently called in the solar industry the "stagnation temperature" of these absorbers and the saturated vapor temperature, or temperature of vaporization $T_{pA}^{(s)}$, of the fluid flowing through them. This statement is true both in the case where this fluid is the power-cycle working fluid itself, or a separate fluid used to vaporize the power-cycle working fluid in a heat exchanger. Methods and means for computing $\dot{Q}_{pA}$ in the case of a spatially uniform collector absorber surface were discussed in detail in the two cited co-pending applications.

The rate $\dot{Q}_{pA}$ at which a liquid or air, flowing through collector absorbers, absorbs sensible heat is determined, at any given time, uniquely—for a given collector array—by methods and means discussed in detail in published documents. The prior art, however, does not disclose methods or means for computing $\dot{Q}_{pA}$ to a desirable accuracy in cases where a liquid is first preheated and then vaporized in a collector or array of collectors, and where (a) the amount of sensible heat absorbed during preheating is a significant part—let alone a major part—of the amount of the latent heat adsorbed during vaporization, and (b) the ratio of the amount of sensible and latent heat absorbed varies significantly—let alone considerably—with changes in operating conditions.

It should be obvious to those skilled in the art, how the foregoing methods and means can be combined to compute $\dot{Q}_{pA}$ in cases where a liquid is first preheated and then vaporized in a collector array. Suffice it to say that for the purposes of the subject matter disclosed in this application a satisfactory estimate of $\dot{Q}_{pA}$ can, in general, be obtained from measured values of $T_{eq}$, $T_{pA}^{(s)}$, and $T_e$, where $T_e$ is the equivalent temperature of the collector array's surroundings. In fact, a quite satisfactory estimate can be obtained for high-temperature collectors by neglecting wind effects and by using the temperature $T_{pc,o}$ of the power-cycle working fluid at the condenser exit. Furthermore, such an estimate is expected usually to be adequate even for medium-temperature solar collectors. The last two statements assume that an air cooled, or an atmospheric water cooled, condenser is employed. Otherwise, $T_e$ and not $T_{pC,o}$ should be used in estimating $\dot{Q}_{pA}$.

A method and means for estimating $\dot{Q}_{pA}$ to any desirable and useful degree of accuracy is disclosed at a later point in this application for the case where a liquid is both preheated and vaporized in a solar collector and the ratio of the heat absorbed by preheating and vaporization varies with operating conditions.

GENERAL DISCUSSION OF METHODS AND MEANS FOR MAXIMIZING DELIVERED POWER

All methods and means envisioned for maximizing delivered power, whether it be the power delivered by the solar-powered heat engine or by the device driven by this engine, or by the system to which this device belongs, have the following common features:

A. The actual power delivered is, in essence, compared with the power which should be delivered for maximum utilization of the solar radiant energy intercepted by the solar collector, and the difference is used as an error signal to adjust the load presented to the heat engine or to the driven device, or to the system to which this device belongs, as applicable, thus changing the mass flow rate of the power cycle working fluid through the engine, and thus changing in turn the temperature of vaporization of this working fluid until the actual power delivered is equal, within the accuracy of the control system, to the maximum deliverable power.

B. The estimate of the maximum deliverable power, under the prevailing conditions at any instant external to the power system, or to the power system and the device driven by the solar-powered engine, or to the power system and the system to which this device belongs, as applicable, includes the computation of $\dot{H}_{Emg}$—as defined earlier in this application and more precisely in the first cited co-pending application—in terms, effectively, of the rate $\dot{Q}_{pA}$ at which the power-cycle working fluid absorbs solar heat and in terms of the efficiency $\eta_p$ of the Rankine power cycle.

A set of methods and means for accomplishing the functions described under A and B above is described in the first cited co-pending application, and other sets of methods and means can easily be inferred by those skilled in the art. In essence, the methods and means described in this cited co-pending application provide an estimate of $\dot{H}_{Eng}$ in terms of the states traversed, in the pressure-enthalpy diagram, by the power-cycle working fluid during an ideal Rankine power cycle corresponding to the prevailing conditions.

In the present disclosure I shall not show explicitly in the figures such computations. I shall however, indicate, explicitly the inputs from the fluid circuits to a central control unit, denoted generically by the abbreviation CCU, and the outputs from the CCU to the controlled units. Furthermore, I shall give two alternative expressions for $\dot{H}_{Eng}$ as an illustration of the many different methods of computation available.

The first alternative expression is given by equations (7) and (8), and the second alternative expression is given by equation (13).

GENERAL DISCUSSION OF WAYS FOR ADJUSTING THE LOAD PRESENTED TO THE SOLAR-POWERED ENGINE

As mentioned earlier, the general method employed to maintain, at any given time, the temperature of vaporization of the power-cycle working fluid at the desired value is to control the load presented to the solar-powered engine by the device driven by this engine.

Known ways of modifying the load, or in particular the torque, presented to the output shaft of an engine, are (a) to change the ratio of the speed $N_D$ of the input shaft of the driven device to the speed $N_{Eng}$ of the output shaft of the engine;

(b) to use a conventionally-powered engine, or an electric motor, to share the mechanical load presented by the driven device to the solar-powered engine;

(c) to use a conventionally-powered engine or an electric motor to drive a device similar to, or identical with, the device driven by the solar engine and to use the former device to share the load presented to the device driven by the solar-powered engine.

In principle, all three of the foregoing three ways for modifying the load presented to the solar engine can be used in a single solar-powered system. In many cases, however, the most costeffective system will be obtained by using no more than two of these ways in any one system; and, in some cases, no more than one. This is particularly true for small systems, say, those with a peak shaft output power up to 10 kw.

Usually, where only one or two of the foregoing three ways are used, the first two ways are preferred. However, the third way may be preferred in some special cases, and would be mandatory where it is desired to use the second way (alone or together with the first way), but the solar-driven device is not designed to be driven by two engines, or by an engine and an electric motor, at the same time.

Methods and means for controlling the load, and in particular the torque, presented to the solar engine, by using either or both of the first two ways, can be described in detail without specifying the type of device driven by this engine. (For example, the description of a selected method would apply equally well to a pump, or an electric generator, driven by the solar engine.) However, where the third way of modifying the torque is used, methods and means for controlling it cannot be so described without specifying the device being driven. I therefore restrict the discussion of control methods for modifying the torque presented to the solar engine by using the third way to the particular cases where the driven device is a compressor of a cooling system employing a two-phase liquid-vapor cycle. It should be clear to those skilled in the art how simplified versions of these methods can be used to control the torque presented to the solar heat engine by a pump. (A pump can be thought of as a particular type of compressor where the compressibility of the fluid can be neglected.)

The symbol ⊙ is used in FIGS. 1, 1A, 1B, 1C, 1D, 2, 3, and 4, to indicate that the quantities designated by letters next to this symbol are transmitted to or from the CCU depending on the direction of the arrow shown. Similarly, the symbol ⓔ is used in FIGS. 1C and 1D to indicate that the quantities designated by letters next to this symbol are supplied by a source external to the solar power system.

DETAILED DESCRIPTION OF A TYPICAL EMBODIMENT OF THE INVENTION

A heat engine powered by solar radiation is old. However, no one prior to the invention disclosed in my co-pending application Ser. No. 457,271 now U.S. Pat. No. 4,211,207 has conceived an arrangement for using a solar-powered heat engine to drive a device in which (a) the temperature of vaporization of the power-cycle working fluid can be controlled, over a wide range of insolations and outdoor temperatures, so as to maximize the power delivered by this engine, or by the device driven by this engine, by modifying the load presented to this engine;

(b) dry saturated vapor, namely vapor of quality one, or vapor with a preselected amount of superheat, is supplied to the heat engine; or (c) the power-cycle working fluid is heated by a separate fluid, referred to as the heat-transfer fluid which absorbs in part latent heat from a solar collector and releases in part latent heat to the power-cycle working fluid.

Figure 1:
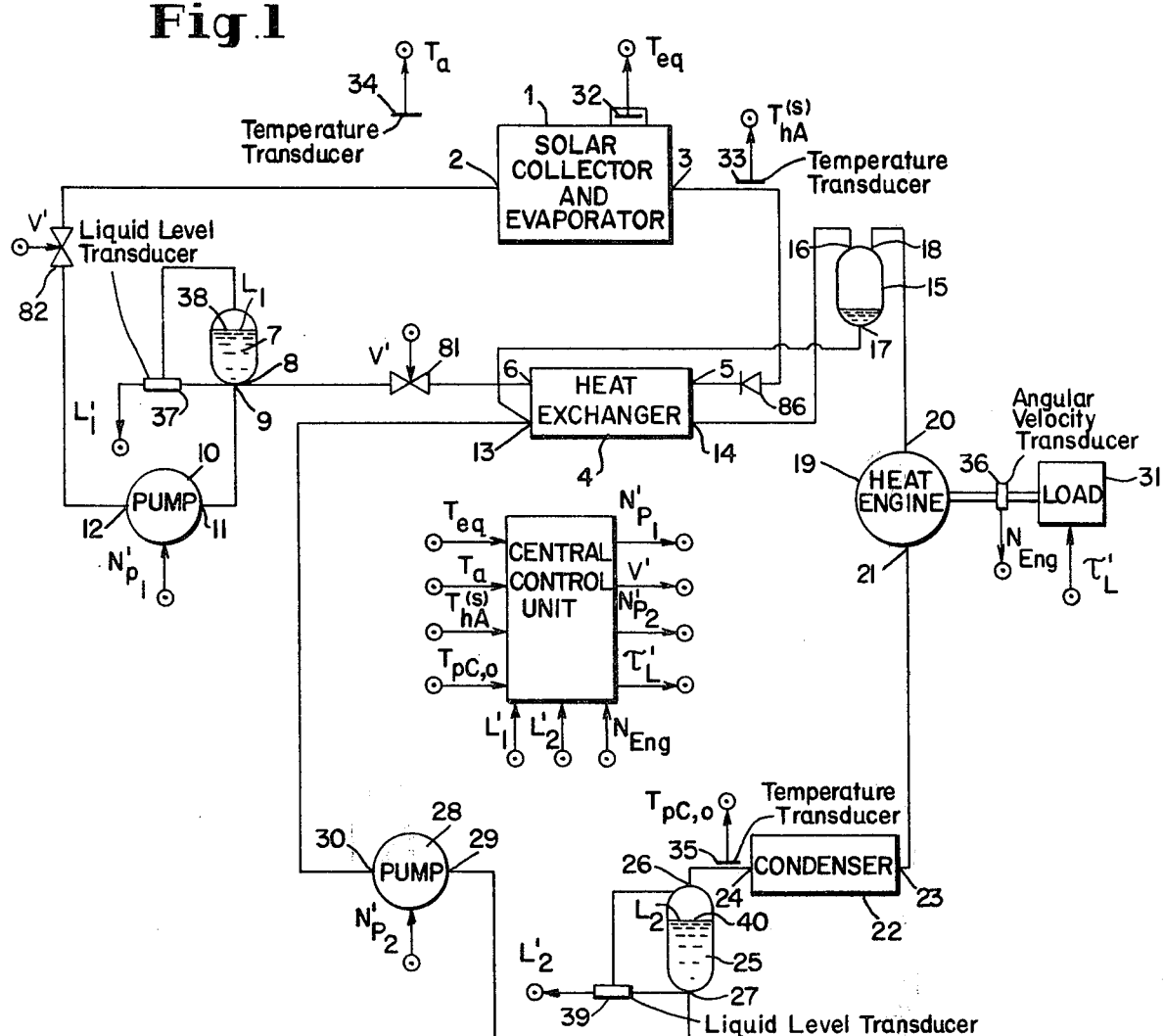
FIG. 1 illustrates in diagramatic form a typical embodiment of the present invention where a separate heat-transfer fluid is employed to absorb solar radiant heat and to use this heat to preheat and vaporize the power cycle working fluid.

The system shown in FIG. 1 illustrates the particular case where (a) the control objective is to maximize the power delivered by the solar-powered engine;

(b) vapor of quality one is supplied to the solar-powered engine; and (c) the heat-transfer fluid used in the same type of fluid as the power-cycle (working) fluid and is used to both preheat and vaporize the power-cycle fluid.

Referring to FIG. 1, liquid heat-transfer fluid enters solar collector and evaporator 1 and 2, and is heated and vaporized as it flows through the fluid passages of this solar collector and evaporaator. The evaporated portion of the liquid heat-transfer fluid entering at 2 exits at 3 with vapor quality one, and enters heat-exchanger 4 at 5 where it is condensed and subcooled. The subcooled heat-transfer liquid exits at 6, and enters liquid reservoir 7 at 8. The liquid heat-transfer fluid exits this reservoir at 9, enters pump 10 and 11, exits at 12, and is returned by this pump to entrance 2 of collector evaporator 1. The method and means used to control the heat-transfer fluid mass flow rate can, in essence, be any of those methods and means described in my co-pending application Ser. No. 457,271 now U.S. Pat. No. 4,211,207, under the heading "RANKINE-TYPE HEAT TRANSFER CYCLE," that use a liquid-vapor separator and a condensate pump, or any of those described in my co-pending application Ser. No. 902,950 under the heading "SPECIFIC EMBODIMENT OF CLASS A SYSTEMS WITH CONDENSATE PUMP." The collector and evaporator 1 may use a natural-circulation evaporator, also referred to as a gravity-circulation evaporator, as defined under the heading "GRAVITY-CIRCULATION FLOODED EVAPORATORS FOR CLASS A SYSTEMS" in my co-pending application Ser. No. 902,950, or may use a forced-circulation evporator as defined under the heading "FORCED-CIRCULATION FLOODED EVAPORATORS" in this same co-pending application. Furthermore, if the type of heat-transfer fluid used does not freeze at the lowest equivalent temperature of the solar collector's surroundings, pump 10 need not be used, and any one of the methods and means described in the latter cited co-pending application under the heading "SPECIFIC EMBODIMENT OF CLASS A SYSTEMS WITH NO CONDENSATE PUMP" can be used to control the heat-transfer fluid mass flow rate.

Referring again to FIG. 1, liquid power-cycle fluid, referred to elsewhere in this application also as "working fluid," or as "power-cycle working fluid," enters heat exchanger 4 at 13 and, after being heated and vaporized in this heat-exchanger, exits at 14. The fluid exiting at 14 enters liquid-vapor separator 15 at 16. The liquid portion of this fluid exits separator 15 at 17 and is returned to heat-exchanger 4 at 13. The vapor portion of the fluid entering this separator exits at 18 and enters heat engine 19 at 20 and, after being expanded, exits at 21 and enters condenser 22 and 23. The liquid resulting from the condensed vapor exits this condenser at 24, and enters liquid reservoir 25 at 26. The liquid exits this reservoir at 27, enters pump 28 at 29, exits at 30, and is returned by this pump to entrance 13 of heat exchanger 4. The method controlling the pumping means described in claim 36 of my co-pending application Ser. No. 457,271, now described in claim 24 of U.S. Pat. No. 4,211,207, can be used to control pump 28.

The same method, and means for controlling specifically pump speed, is described, in greater detail, under the heading "SPECIFIC EMBODIMENT OF CLASS A SYSTEMS WITH CONDENSATE PUMP" in my co-pending application Ser. No. 902,950. The method and means for controlling pump speed referred to as "second method of control" under the heading "CONTROL SYSTEM FOR CLASS A EMBODIMENTS" in the cited latter co-pending applications can also be used. Either of these methods, together with separator 15, cause quality one vapor to be supplied to heat engine 19 at all times independently of other prevailing conditions internal to, or external to, the power system shown in FIG. 1.

Heat engine 19 drives load 31, which includes the driven device and any associated components, such as reduction gears and belts and pulleys, that affect the load, and in particular the torque $T_L$, presented to the output shaft of heat engine 19.

The input signals to the CCU are provided by temperature transducer 32 which measures the radiation equilibrium temperature $T_{eq}$, as defined earlier, temperature transducer 33 which measures the saturated vapor temperature $T_{hA}^{(s)}$ at the exit of collector and evaporator 1, temperature transducer 34 which measures the outdoor ambient temperature $T_a$, temperature transducer 35 which measures the temperature $T_{pC,o}$ of the liquid power-cycle fluid at the exit 24 of condenser 22, angular-velocity transducer 36 which measures the rotational speed of the output shaft of heat engine 19, liquid-level transducer 37 which measures liquid level 38, denoted by $L_1$, in liquid reservoir 7, and liquid-level transducer 39 which measures liquid level 40, denoted by $L_2$, in liquid reservoir 25.

The output signals from the CCU are signal $T_L'$, which is used to control the torque presented by load 31 to heat engine 19; signal $N_{P1}'$, which is used to control the speed of pump 10; and signal $N_{P2}'$, which is used to control the speed of pump 28. Signals $N_{P1}'$ and $N_{P2}'$ are obtained from liquid level signals $L_1'$ and $L_2'$, respectively, as explained in the two co-pending applications cited earlier.

Signal $T_L'$ is obtained from signals $T_{eq}$, $T_{hA}^{(s)}$, $T_{pC,o}$, $T_a$, and $N_{Eng}$, as explained next.

The heat transfer system is assumed to be properly insulated so that one can assume, with a sufficient degree of accuracy, that $$\dot{Q}_{pA} = \dot{Q}_{hA} \qquad (1)$$

where $\dot{Q}_{hA}$ and $\dot{Q}_{pA}$ were defined earlier as the rates at which the heat-transfer fluid absorbs heat from the radiant solar energy intercepted by collector and evaporator 1 and the power-cycle fluid absorbs the heat released by the heat-transfer cycle fluid. With assumption (1), $\dot{Q}_{pA}$ can be computed using input signals $T_{eq}$, $T_{hA}^{(s)}$, and $T_a$. Methods and means for computing the heat absorbed by a solar collector are described in the literature in terms of the incident radiant energy $I_n$ normal to a solar collector aperture, the inlet and outlet collector temperatures, and the outdoor ambient temperature $T_a$. We have, typically, assuming that $T_{pC,o}$ provides an adequate approximation to the inlet temperature of the heat-transfer fluid to solar collector and evaporator 1, $$\dot{Q}_{hA} = F_1 S_{A1} \left[ \overline{\tau \alpha} I_n - U_{A1} \left( \frac{T_{pC,o} + T_{hA}}{2} - T_a \right) \right] \quad (2)$$
$$+ F_2 S_{A2} [\overline{\tau \alpha} I_n - U_{A2}(T_{hA}^{(s)} - T_a)]$$

where the first term represents the rate at which sensible heat is absorbed by collector and evaporator 1 and the second term represents the rate at which latent heat is absorbed by collector and evaporator 1. The quantities $S_{A1}$ and $S_{A2}$ are the collector aperture areas corresponding optically to the surface areas of the fluid passages within which the heat-transfer fluid absorbs sensible and latent heat, respectively, $F_1'$ and $F_2'$ are the fin efficiencies of these surfaces, and $U_{A1}$ and $U_{A2}$ their heat-loss coefficients. The quantity $\overline{\tau \alpha}$ is the mean absorptance-emittance product of the collector. From the discussions given in the two cited co-pending applications, it follows that $$k_e(T_{eq} - T_a) = \overline{\tau \alpha} I_n \qquad (3)$$

where $k_e$ is, as mentioned in these applications, determined by calibration tests. It follows from equations 1, 2, and 3, that $$\dot{Q}_{pA} = \dot{Q}_{hA} = F_1 S_{A1} \left[ k_e(T_{eq} - T_a) - U_{A1} \left( \frac{T_{pC,o} + T_{hA}^{(s)}}{2} - T_a \right) \right] \quad (4)$$
$$+ F_2 S_{A2}[k_e(T_{eq} - T_a) - U_{A2}(T_{hA}^{(s)} - T_a)]$$

This expression is instrumented in the CCU. The correct values for $S_{A1}$ and $S_{A2}$ can often be estimated to sufficient accuracy by using the two relations $$S_{A1} + S_{A2} = S_A \qquad (5)$$

and $$\frac{S_{A1}}{S_{A2}} = \frac{c(T_{hA}^{(s)} - T_{pC,o})}{h_{lg}} \qquad (6)$$

where $S_A$ is the total area of the collector absorber surfaces, c is the average specific heat of the liquid heat-transfer fluid between temperatures $T_{pC,o}$ and $T_{hA}^{(s)}$, and $h_{lg}$ is the latent heat of evaporation of this fluid at temperature $T_{hA}^{(s)}$.

The power $\dot{H}_{Eng}$ delivered by an ideal heat engine is given, as stated in my cited co-pending application Ser. No. 457,271 now U.S. Pat. No. 4,211,207 by $$\dot{H}_{Eng} = \dot{m}_p h_{Eng} \qquad (7)$$

where $$\dot{m}_p = \frac{\dot{Q}_{pA}}{h_{lg} + c(T_{pA}^{(s)} - T_{pC,o})} \qquad (8)$$

The specific heat and latent heat of the power-cycle fluid and the heat-transfer fluid have the same values because in the specific example chosen the two fluids have identical properties. The value of $h_{Eng}$ can be computed or instrumented in any desired way from information in published thermodynamic tables or diagrams for the particular power-cycle fluid used in terms of the saturated vapor temperatures $T_{pA}^{(s)}$ and $T_{pC}^{(s)}$, where the temperature of condensation, where negligible subcooling occurs, can be assumed equal to $T_{pC,o}$. A typical way using a pressure-enthalpy diagram and the corresponding saturated vapor pressures $P_{pA}^{(s)}$ and $P_{pC}^{(s)}$ is discussed in the last cited co-pending application. The power $P_{Eng}$ delivered is then computed in the CCU using the relation $$P_{Eng} = \eta_{Eng} \dot{H}_{Eng} \qquad (9)$$

where $\eta_{Eng}$ can be obtained from engine performance tests and expressed and instrumented in terms of $T_{pA}^{(s)}$, $T_{pC}^{(s)}$, assumed here equal to $T_{pC,o}$, and $N_{Eng}$. If the isentropic efficiency is known, the pressure-enthalpy diagram can be used to derive an expression $\dot{H}_{Eng}'$, where $\dot{H}_{Eng}'$ differs from $P_{Eng}$ only by the volumetric and mechanical efficiencies of the engine, which usually depend at most (significantly) on $N_{Eng}$, and therefore can be instrumented as a function of $N_{Eng}$ only.

An alternative method of computing $\dot{H}_{Eng}$ is to assume that the efficiency $\eta_p$ of an ideal Rankine power cycle is proportional to the theoretical efficiency of a Carnot cycle and write $$\eta_p = k_R \left(1 - \frac{T_{pC}^{(s)}}{T_{pA}^{(s)}}\right) \qquad (10)$$

where the coefficient of proportionality $k_R$ can be assumed to be a constant if the ratio $(T_{pC}^{(s)}/T_{pA}^{(s)})$ does not vary during operation over a "wide range". What constitutes a wide range depends on many factors which will not be discussed here. If this ratio varies over a wide range, the factor can be computed to any desirable, useful degree of accuracy, for a given power-cycle fluid, if it is expressed as a function of $T_{pC}^{(s)}$ and $T_{pA}^{(s)}$. A typical expression for $k_R$ would be of the form $$k_R = [1 - k(T_{pA}^{(s)} - T_{pC}^{(s)})^2] \qquad (11)$$

where $k$ is a weak function of $T_{pC}^{(s)}$. The values of $k$ would be determined by computing the efficiency of an ideal Rankine power cycle from published tables and comparing it with the Carnot efficiency for the same values of $T_{pA}^{(s)}$ and $T_{pC}^{(s)}$.

Now $$\dot{H}_{Eng} = \eta_p \dot{Q}_{pA} \qquad (12)$$

so that using (10) and (12), we obtain $$\dot{H}_{Eng} = [1 - k(T_{pA}^{(s)} - T_{pC}^{(s)})^2]\left(1 - \frac{T_{pC}^{(s)}}{T_{pA}^{(s)}}\right) \dot{Q}_{pA} \qquad (13)$$

Equation 13 is an alternative expression for $\dot{H}_{Eng}$ to the one given by equation (7). And again $P_{Eng}$ can be computed from equation (13) by using equation (9).

Independently of the expression used for $P_{Eng}$, the signal used to control the torque $T_L$ presented to the heat engine can be obtained by computing the derivative $$\epsilon_1 = \frac{\delta(P_{Eng})}{\delta(T_{pA}^{(s)})} \qquad (14)$$

and by using a control signal $T_L'$ to adjust the torque $T_L$ so as to make $\epsilon_1$ tend to zero, Alternatively, for example, the quantity $N_{Eng}$ could be computed by instrumenting $$N_{Eng} = \frac{\dot{Q}_{pA}}{\eta_v \rho_{pg} V_{Eng}[h_{lg} + c(T_{pA}^{(s)} - T_{pC,o})]} \qquad (15)$$

and the value of $N_{Eng}$ for which $$\frac{\delta(P_{Eng})}{\delta(T_{pA}^{(s)})} = 0 \qquad (16)$$

determined. The resulting desired value $N_{Eng}^{(d)}$ of $N_{Eng}$ and the actual value $N_{Eng}^{(a)}$ of $N_{Eng}$, obtained from angular velocity transducer 36, would then be used to form the error signal $$\epsilon_2 = N_{Eng}^{(d)} - N_{Eng}^{(a)} \qquad (17)$$

and the control signal $T_L'$ would be used to adjust the torque $T_L$ so as to make $\epsilon_2$ tend to zero.

Expression (15) is obtained from (8) by using the well-known relation $$\dot{m}_p = \eta_v \rho_{pg} V_{Eng} N_{Eng} \qquad (18)$$

where $\eta_v$, $V_{Eng}$, and $N_{Eng}$, are the engine volumetric efficiency, displacement per revolution, and revolution rate, respectively, and where $\rho_{pg}$ is the density of the working cycle fluid vapor at the engine's entrance. Since $V_{Eng}$ is fixed by the engine used, since $\rho_{pg}$ depends for a particular power-cycle fluid only on $T_{pA}^{(s)}$, and since $\dot{Q}_{pA}$ is for practical purposes only a function of $T_{eq}$, $T_{pA}^{(s)}$, and $T_{pC}^{(s)}$, it follows that $N_{Eng}$ is only a function of $T_{eq}$, $T_{pA}^{(s)}$, $T_{pC}^{(s)}$, and $\eta_v$. Sometimes $\eta_v$ can be assumed to be a constant, as for example in the case where the power system is not intended to operate over a very wide range of operating conditions, and the heat engine used is a rotary expander. Usually, it is sufficient to assume that $\eta_v$ is only a function of $N_{Eng}$; but, in any case, $\eta_v$ can certainly be determined to any desired, useful accuracy as a function of $N_{Eng}$, $T_{pA}^{(s)}$, and $T_{pC}^{(s)}$.

If $\eta_{Eng}$ can be assumed, with sufficient accuracy, to be a constant over the operating range of interest, expression (14) and equation (16) would reduce to $$\epsilon_1 = \frac{\delta \dot{H}_{Eng}}{\delta(T_{pA}^{(s)})} \qquad (19)$$

and to $$\frac{\delta \dot{H}_{Eng}}{\delta(T_{pA}^{(s)})} = 0 \qquad (20)$$

respectively; or if the product $(\eta_v \eta_m)$ of the engine's volumetric and mechanical efficiencies is a constant over this range, expression (14) and equation (16) reduce to $$\epsilon_1 = \frac{\delta \dot{H}'_{Eng}}{\delta(T_{pA}^{(s)})} \qquad (21)$$

and to

To discuss the last case intelligibly, I select a specific driven device. I choose for this device the compressor of a cooling system using a two-phase heat-pump cycle.

Figure 1A:
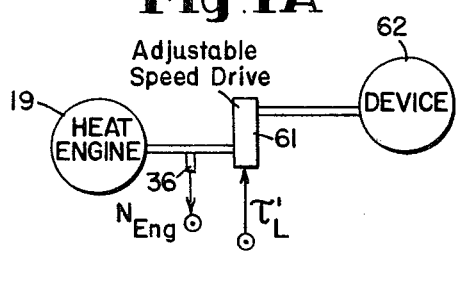
FIGS. 1A through 1D show details of typical examples of generic load 31 in FIG. 1.

In this case, the generic load 31 consists of the adjustable speed drive and the entire cooling system. The cooling system used is old, and therefore only the components needed to explain the new method and means employed to adjust the torque $T_L$ so as to maximize the utilization of solar energy, and to meet the cooling load requirements, are shown explicitly in FIG. 1D. In this figure, the numbers 19, 36, and 61, designate again the solar heat engine, the angular velocity transducer, and the adjustable speed drive, respectively. The cooling system uses a two-stage compounded or cascaded heat-pump cycle whose first-stage compressor 65 is driven by the solar heat engine, and whose second-stage compressor is a constant capacity compressor, or a stepped or continuously-variable capacity compressor, depending on cooling load requirements. The particular case of a constant speed compressor 66, driven by a constant speed electric motor 67, is illustrated in FIG. 1D. The remaining components of the cooling system are represented by 68. The cooling system, in the particular example illustrated in FIG. 1D is used to cool a (liquid) brine which is stored in reservoir 69 and is circulated between the cooling system and this reservoir by circulating pump 70 using the brine circuit identified by numbers 71 through 76.

The reason for using a compounded or cascade heat-pump cycle is not to improve heat-pump cycle efficiency, but to help meet cooling load requirements by supplementing, with electric motor 67, as required, the power delivered by heat engine 19.

I consider first the case where the cooling rate $\dot{Q}_c$, namely the cooling power $P_c$ delivered by the system driven by heat-engine 19, namely the cooling system, meets the cooling load requirements. In this case, the second stage compressor is by-passed using any known method and means, and the cooling system operates as a single-stage heat pump whose compressor 65 is driven by heat engine 19. Consider next the case where heat engine 19 alone cannot meet the cooling load requirements. In this case, motor 67 is started and the cooling system is operated as a two-stage heat pump. In either case, the control signal $T_L'$ is applied to adjustable speed drive 61, and used to control the speed ratio $(N_{Eng}/N_{cp})$, where $N_{cp}$ is the rotational speed of the input shaft of compressor 65.

In the case where heat engine 19 can alone meet the cooling load, the signal $T_L'$ can be used either to maximize $P_{Eng}$, $P_{cp}$, or $P_c$, by using $P_{Eng}$ in expression (14) or equation (16), or by using $$P_{cp} = \eta_{cp} P_{Eng} \quad (25)$$

or $$P_c = \eta_{HP} P_{Eng} \quad (24)$$

in either (14) or (16), where $P_{cp}$ and $\eta_{cp}$ correspond to $P_D$ and $\eta_D$ in equation (23) in the particular case where the device driven by heat engine 19 is a compressor.

In the case where heat engine 19 cannot alone meet the cooling load, the signal $T_L'$ should be used to maximize either $P_{Eng}$, or preferably $P_{cp}$, but should not be used to maximize the cooling power delivered by the heat pump, namely to maximize the rate at which heat is absorbed from the brine. Namely, the preferred control objective in this case is to ensure the most utilization of solar energy by compressor 65, and to use the electric motor 67 and compressor 66 to deliver the additional power required to meet cooling load requirements.

In the case illustrated in FIG. 1D, a reservoir is provided for the type of energy delivered by the system, driven by the solar power system, namely the cooling system. In this case, the controls needed to control the power delivered in excess of that delivered by the solar power system can be very simple. For example, if cooling power in excess of that provided by the solar power system is required only to maintain the temperature $T_b$ of the brine in reservoir 69 below an upper limit $(T_b)_{max}$, the controls needed to operate motor 67 need only, apply a signal M' to start motor 67, and keep it running, whenever $T_b$ exceeds $(T_b)_{max}$; and remove this signal, to stop this motor whenever $T_b$ falls below a preselected value smaller than $(T_b)_{max}$.

Whenever a reservoir is not provided for storing chilled brine, and the cooling system is required to deliver power at a specified rate, compressor 66 must be replaced by a variable capacity compressor. In this case, the capacity of this compressor would be varied so that the total cooling power delivered by this compressor and compressor 65 causes the actual cooling power delivered by the heat pump to be equal to the desired cooling power.

In practice, the system shown in FIG. 1D would include means for by-passing compressor 65 and operating compressor 66 alone by old methods and means.

DISCUSSION, MODIFICATIONS AND VARIATIONS RELATED TO HEAT-TRANSFER CIRCUIT

The liquid level in reservoir 7 must always remain above entrance 8 to provide a liquid seal. A liquid reservoir, where this condition is satisfied is called a surge-type receiver in the refrigeration industry, and is usually provided with a vent line to the condenser. A typical arrangement is shown in FIG. 1E. In this figure, numbers 4, 6, 7, 10, and 11, indicate the same devices or points as those designated by these numbers in FIG. 1. The line between 41 and 42 is a vent line, whose function is described on pages 26-8 and 26-9 of the 1976 Systems ASHRAE Handbook and Product Directory. Also in FIG. 1E, the entrance 8 and exit 9 shown in FIG. 1, have been combined into a common entrance and exit 43.

Figure 2:
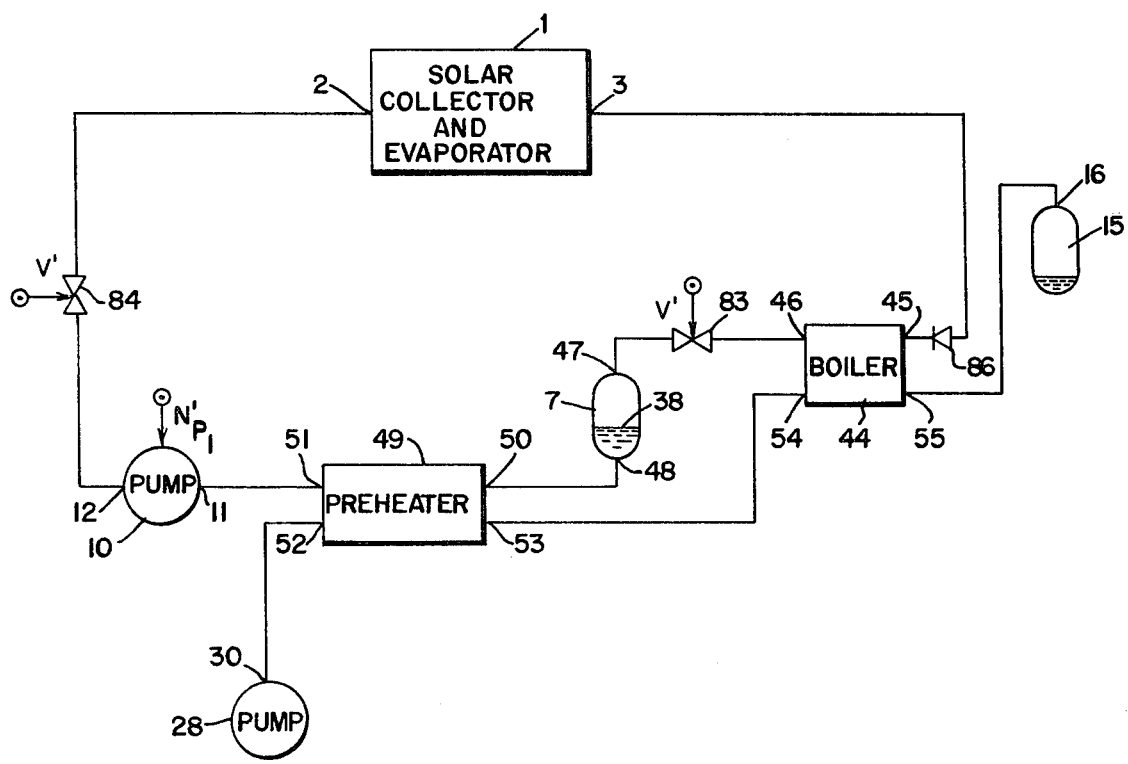
FIG. 2 illustrates a first alternative configuration of the embodiment of the present invention shown in FIG. 1.

FIG. 2 shows an alternative arrangement to that shown in FIG. 1. In FIG. 2, the condensation of the heat-transfer fluid and the vaporization of the power-cycle fluid referred to elsewhere in this application also as "working fluid" or as "power-cycle working fluid" on the one hand, and the subcooling of the former fluid and the preheating of the latter fluid on the other, are performed in two separate heat exhchangers referred to as the boiler and preheater, respectively. In FIG. 2, the numbers 1, 2, 3, 7, 10, 11, 12, 15, 16, 28, and 30, indicate the same devices or points as those designated by these numbers in FIG. 1 except that receiver 7 shown in FIG. 2, for purposes of illustration, is of the type known as a 'feed-through receiver' and the components of the system not shown in FIG. 2 are identical to those in FIG. 1. In FIG. 2, the heat-transfer fluid enters boiler 44, instead of heat exchanger 4 in FIG. 1, at 45, and in sequence exits this boiler at 46, enters liquid reservoir 7 at 47 and exits at 48, enters preheater 49 at 50 and exits -continued $$\frac{\delta H'_{Eng}}{\delta(T_{pA}^{(s)})} = 0 \quad (22)$$

MODIFICATIONS TO TYPICAL EMBODIMENT OF THE INVENTION TO MAXIMIZE THE POWER DELIVERED BY THE DEVICE OR SYSTEM DRIVEN BY THE SOLAR POWERED HEAT ENGINE

To maximize the power delivered by the device driven by the solar-powered heat engine, instead of the power delivered by the engine itself, one need only compute the overall efficiency $\eta_D$ of the driven device and use $P_D$ instead of $P_{Eng}$ in expression (14) or equation (16), where I define $P_D$ by $$P_D = \eta_D \cdot P_{Eng} \quad (23)$$

The efficiency $\eta_D$ can be determined by performance tests in terms of its operating parameters in a similar way to the one used in determining the efficiency $\eta_{Eng}$ of the heat engine in terms of its operating parameters. For example, if the driven device is the compressor of a two-phase heat pump used for cooling, it will often be sufficient to express $\eta_D$ as a function of its speed $N_D$ only, and it will sometimes even be sufficient to assume $\eta_D$ is a constant. An automotive rotary vane compressor is an example of a compressor which usually has a nearly constant efficiency over a range $N_D$ between 500 and 2500 rpm. In any case, the compressor efficiency $\eta_D$ can certainly be expressed to any desired, useful accuracy in terms of its speed $N_D$, its vapor inlet temperature, and the difference between the pressures at its vapor outlet and inlet.

To maximize the power delivered by the system driven by the solar-powered heat engine, instead of the power delivered by the device driven by this engine, one need only substitute in equation (23) the overall efficiency of the driven system for the efficiency $\eta_D$ of the driven device. For example, in the case of the heat pump just discussed, the efficiency $\eta_{HP}$ with which this heat pump absorbs heat, namely cools, a substance is given by the product $\eta_{cp}\eta_c$, where $\eta_{cp}$ is the overall efficiency of the compressor driven by the heat engine and $\eta_c$ is the efficiency of the cooling cycle used in this heat pump. In this particular case, the power $P_c$ delivered by the system driven by the heat engine is the rate $\dot{Q}_c$ at which this system absorbs heat from the the substance being cooled, and one would use $P_c$ in expression (14) or equation (16) instead of $P_{Eng}$, where $$P_c = \eta_{HR} \cdot P_{Eng} \quad (24)$$

The efficiency $\eta_c$ of the cooling cycle can be computed and instrumented in the CCU in terms of saturated vapor temperature of evaporation and the saturated vapor temperature of condensation in a single stage heat pump or equivalently in terms of the corresponding pressures.

The symbol $\odot$ is used in FIGS. 1, 1A, 1B, 1C, 1D, 2, 3, and 4, to indicate that the quantities designated by letters next to this symbol are transmitted to or from the CCU depending on the direction of the arrow shown. Similarly, the symbol $\odot$ is used in FIGS. 1C and 1D to indicate that the quantities designated by letters next to this symbol are supplied by a source external to the solar power system.

ILLUSTRATION OF METHODS AND MEANS FOR ADJUSTING IN DIFFERENT WAYS THE LOAD PRESENTED TO THE SOLAR-POWERED ENGINE

I mentioned earlier in the present specification three general ways of adjusting the load, and in particular, the torque $T_L$, presented to the solar-powered heat engine, and stated that any one of these ways, or a combination of any two or all three of these ways, could be used to adjust $T_L$. I also stated that the use of all three ways is unlikely to be cost-effective, and I now add that I expect the combination of ways (b) and (c) will rarely be used. Furthermore, it should be obvious to those skilled in the art how the combination of ways (a) and (b) can be used after the combination of ways (a) and (c) have been described. I therefore limit the following discussion to the remaining four cases.

I discuss first the three cases that can be discussed with adequate specificity without identifying the device driven by the heat engine, which can be any mechanically driven device.

Figure 1B:
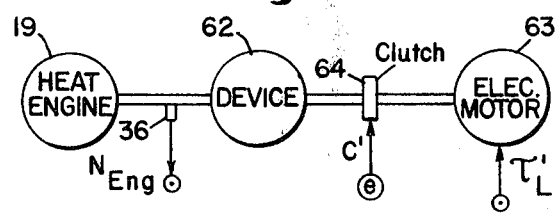

The case where the torque $T_L$ is adjusted by only changing the ratio of the speed $N_D$ of the input shaft of the driven device to the speed $N_{Eng}$ of the output shaft of the heat engine is shown in FIG. 1B. In this figure, numbers 19, and 36, indicate the same components as those designated by these numbers in FIG. 1. The generic load 31, shown in FIG. 1, in shown explicitly, in FIG. 1A, to comprise adjustable-speed drive 61 and mechanically-driven device 62. Drive 61 can be any type of adjustable speed drive which can be controlled by an electrical signal either directly, or through a transducer, which may for example be an electrical-to-mechanical transducer. In FIG. 1A the control signal $T_L'$, which was applied in FIG. 1 to the generic load 31, is shown applied specifically to adjustable speed drive 61. The arrangement shown in FIG. 1A assumes that any load, driven by 62—which may for example be a hydraulic, mechanical, or electrical load—which exceeds the load which can be handled by heat engine 31, is satisfied by a separate conventionally driven system which in no way is interconnected to the solar-powered system.

The case where no adjustable speed drive is used and an electric motor 63 is used to adjust the torque $T_L$ is shown in FIG. 1B. In this case the load 31 consists of device 63, electric motor 63, clutch 64, and the mechanical shafts between them; and control signal $T_L'$ is now applied to motor 63 and used to change its torque. Clutch 64 is engaged whenever motor 63 is operated by on-signal C' and disengaged whenever it is not. The generic load indicated by 31 in FIG. 1 consists in this case of components 62, 63, and 64.

Figure 1C:
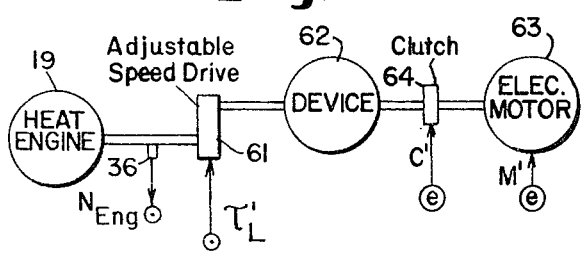
Figure 1E:
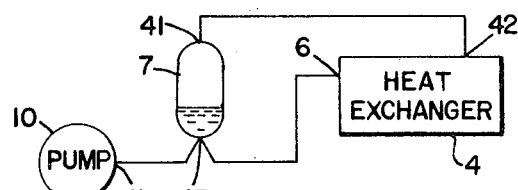
FIG. 1E shows details of the interconnections between liquid reservoir 7 shown in FIG. 1 on the one hand, and heat exchanger 4 and the liquid lines between points 6 and 7 and points 9 and 11, also shown in FIG. 1, on the other.
Figure 1D:
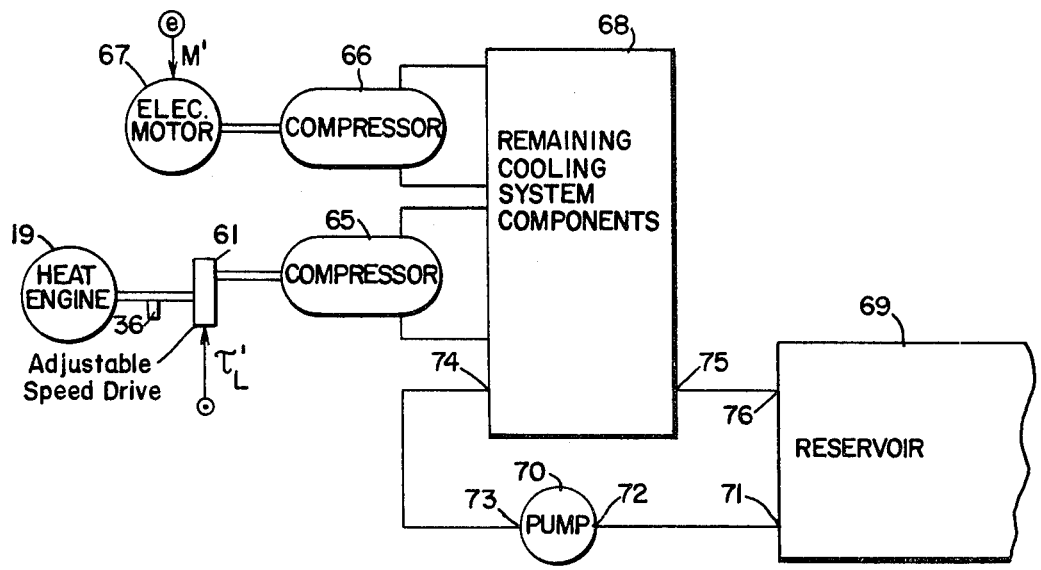

The case where both an adjustable speed drive and an electric motor is used is shown in FIG. 1C, where 61 is, as in FIG. 1A, an adjustable speed drive, and where the numbers 19, 36, 62, 63, and 64, indicate the same components as those designated by these numbers in FIG. 1B. The signal $T_L'$ is applied to adjustable speed drive 61, and the motor 63 and clutch 64 are controlled by signals M' and C', generated outside the power system, whenever the load driven by 63 exceeds the power delivered by engine 19. In this case the generic load 31 comprises components 61, 62, 63, and 64.

at 51. From 51, the liquid heat-transfer fluid enters, as in FIG. 1, pump 10 at 11. Also, in FIG. 2, the power-cycle fluid exits, as in FIG. 1, pump 28 at 30, and in sequence enters the preheater 49 at 52 and exits at 53, enters boiler 44 at 54 and exits at 55. From 55, the power-cycle fluid enters, as in FIG. 1, separator 15 at 16, but vaporized power-cycle fluid can be returned (and usually is returned), in the system shown in FIG. 2, at point 77 located anywhere in the heat-transfer fluid circuit segment which includes heat-transfer fluid reservoir 7 and is bounded by boiler outlet 46 and preheater inlet 50.

A prerequisite for the most efficient utilization of the radiant energy intercepted by solar collector and evaporator 1 by heat engine 19 is that the temperature of the power cycle working fluid, within the constraints imposed by cost on the size of heat exchangers used, be as nearly as possible equal to the temperature of the heat-transfer fluid along the entire adjacent fluid-circuit segments where heat-transfer is occurring. These segments are located between points 5 and 6 and points 13 and 14 in FIG. 1, and between points 45 and 46, points 54 and 55, points 50 and 51, and points 52 and 53 in FIG. 2. In particular, the temperature of the liquid power-cycle fluid must be as near as possible, within the limits imposed by the foregoing cost constraints, to the temperature of the heat-transfer fluid at all the points where heat is being transferred from the latter to the former.

Figure 3:
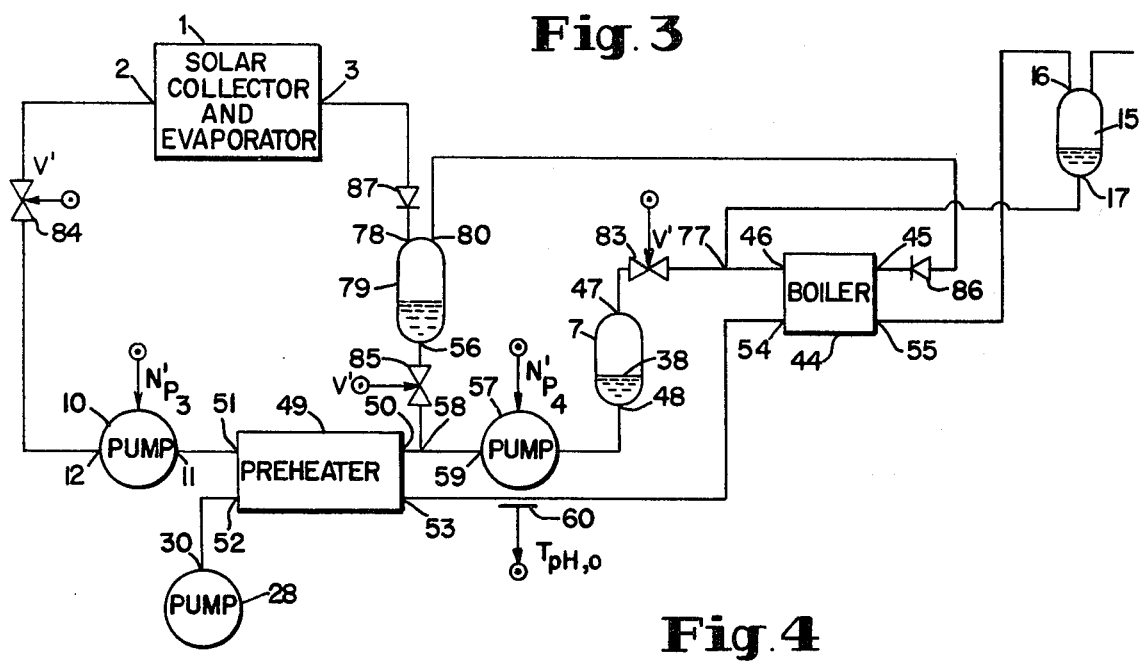
FIG. 3 illustrates a second alternative configuration of the embodiment of the present invention shown in FIG. 1.

It can be shown that this objective can be approached closely with the fluid-circuit configurations shown in FIGS. 1 and 2, provided the same type of fluid is used for both the power and heat-transfer cycles. It can, furthermore, be shown that this objective can also be approached closely if the ratio of the latent heat to the liquid specific heat of the power-cycle fluid is equal to the ratio of the latent heat to the liquid specific heat of the heat-transfer fluid, provided these ratios remain substantially constant over the desired range of operating conditions. If this ratio, however, is significantly different, the earlier stated objective can be accomplished only if a different fluid-circuit configuration to the one shown in FIG. 1 of FIG. 2 is used. FIG. 3 shows a typical fluid-circuit configuration and control system which can approach closely this objective also in the case where not enough pre-heating would be provided by the configurations of FIGS. 1 and 2 with a particular pair of fluids; namely, when the ratio $(c/h_{eg})_h$ of the heating fluid is smaller than the ratio $(c/h_{eg})_p$ of the heated fluid.

The points and devices designated in FIGS. 2 and 3 by identical numbers are the same, and the components of the system not shown in FIG. 3 are identical to those in FIG. 1. However, the system shown in FIG. 3 differs from that shown in FIG. 2 as follows.

Solar collector and evaporator 1 is restricted to the type which includes no (liquid-vapor) separator for returning non-evaporated heat-transfer fluid to the collector and evaporator fluid passages in which heat, absorbed from collected radiant energy, is transferred to the heat-transfer fluid. Second, inlet 78 of separator 79 is connected to outlet 3 of collector and evaporator 1, and vapor outlet 80 of the separator is connected to inlet 45 of boiler 44. Third, pump 57 is connected between points 48 and 50. Fourth, the exit 56 is connected to point 58 between exit 59 of pump 57 and entrance 50 of preheater 49. These are the only differences between the fluid circuits shown in FIG. 3 and those shown in FIG. 2. However, the following differences exist between the control methods and means used in FIG. 2 and FIG. 3. Pump 10 is controlled as follows. The temperature $T_{hH,o}$, measured by temperature transducer 60, is supplied to the CCU. The CCU computes the actual difference $(T_{pA}{}^{(s)} - T_{pH,o})^{(a)}$ obtained from measured values of $T_{pA}{}^{(s)}$ and $T_{pH,o}$, and the desired minimum temperature difference $(T_{pA}{}^{(s)} - T_{pH,o})^{(d)}$ as a function of the mass flow rate $\dot{m}_p$, with $\dot{m}_p$ computed by instrumenting equation (8) and using values or $h_{eg}$ and c for the particular power-cycle fluid employed. The value chosen for this desired minimum value depends on the system design parameters; but, for a properly designed system, will usually lie in the range between 0° C. and 10° C. In some cases, a fixed value of $(T_{pA}{}^{(s)} - T_{pH,o})^{(d)}$ may be adequate. The CCU forms the difference $$\epsilon_3 = (T_{pA}{}^{(s)} - T_{pH,o})^{(d)} - (T_{pA}{}^{(s)} - T_{pH,o})^{(a)}$$

and the control signal $N_{P3}'$ is applied to pump 10 to adjust its speed $N_{P3}$ so as to make $\epsilon_3$ tend to zero. Second, pump 57 is controlled by liquid level 38 in liquid reservoir 7 with signal $N_{P4}'$ in the same way pump 10 is controlled in FIGS. 1 and 2 with signal $N_{P1}'$ by this level.

The heat-transfer fluid circuits shown in FIGS. 1, 2, and 3, can be used with heat-transfer fluids that freeze at a temperature above some or all of the equivalent outdoor temperatures in the vicinity of collector and evaporator 1. To this end, in the system shown in FIG. 1, liquid valve 81 is installed in the fluid-line between exit 6 of heat exchanger 4 and entrance 8 of liquid reservoir 7, and liquid valve 82 is installed in the fluid-line between exit 12 of pump 10 and entrance 2 of collector and evaporator 1; in the partial system shown in FIG. 2, liquid valve 83 is installed in the fluid line between the exist 46 of boiler 44 and the entrance 47 of liquid reservoir 7, and liquid valve 84 is installed in the fluid line segment between exit 12 of pump 10 and entrance 2 of collector and evaporator 1; and, in the partial system shown in FIG. 3, a third liquid valve, 85 in addition to the two valves 83 and 84 added to the system shown in FIG. 2, must be installed in the fluid line between liquid exit 56 of separator 79 and point 58 at which this fluid line is connected to the line between exit 59 of pump 57 and entrance 50 of preheater 49, In all cases, the fluid circuit segments that do not include collector and evaporator 1 and are located between the two valves added to the circuits shown in FIGS. 1 and 2, and the three valves added to the circuits shown in FIG. 3, must (1) have enough volume to accomodate the entire part of the heat-transfer fluid in the liquid phase, (2) be maintained at a temperature above the temperature at which the heat-transfer fluid employed freezes by, for example, being located in a building or enclosure maintained above this temperature. I shall refer to the foregoing fluid segments collectively as "interior heat-transfer circuits", and to the remaining heat-transfer fluid segments, including those in collector and evaporator 1 as "exterior heat-transfer circuits". I consider two cases.

In the first case, (a) the heat-transfer circuits are configured so that, after deactivation of the solar power system, the entire liquid portion of the heat-transfer fluid in the exterior heat-transfer circuits can, under the action of gravity, drain into the interior heat-transfer circuits, and (b) the lowest saturated vapor temperature $(T_{hA}{}^{(s)})_{min}$—of the heat-transfer fluid in collector and evaporator 1—at which the solar power system is de-activated exceeds the temperature at which the heat-transfer fluid freezes by an amount which is sufficient for the entire liquid portion of the heat-transfer fluid in the exterior heat-transfer circuits to drain into the interior heat-transfer circuits before the temperature of any part of the exterior heat-transfer circuits falls to the freezing point $T_h^{(f)}$. The minimum value of $\{(T_{hA}^{(s)})_{min} - T_h^{(f)}\}$ for which the foregoing entire liquid portion is transferred to the interior heat-transfer circuits before $T_{hA}^{(s)}$ falls to $T_h^{(f)}$ depends, for a given installation, on many factors, including the inclination of the slopes provided for draining the liquid from the exterior heat-transfer circuits into the interior heat-transfer circuits, the latent heat of the heat-transfer fluid used, and the thermal capacity of the exterior heat-transfer circuits. In any case, the minimum value of $\{(T_{hA}^{(s)})_{min} - T_h^{(f)}\}$ can be determined for a given installation by tests, and the CCU can be provided with means for generating a signal to de-activate the solar power system whenever $\{(T_{hA}^{(s)})_{min} - T_h^{(f)}\}$ falls below this minimum value. A typical value of $\{(T_{hA}^{(s)})_{min} - T_h^{(f)}\}$ might lie between 50° C. and 75° C.

In the second case, the heat-transfer circuits are not configured so that, after de-activation of the solar power system, the entire liquid portion of the heat-transfer fluid in the exterior heat-transfer circuits can, under the action of gravity alone, be transferred to the interior heat-transfer circuits. For example, the exterior heat-transfer circuits could include horizontal segments—such as horizontal fluid lines located near the focal line of a parabolic solar collector with an East-West axis—or could even include segments which are sloped so that the effect of gravity opposes liquid transfer instead of assisting it. In this case, the lowest saturated vapor temperature $(T_{hA}^{(s)})_{min}$ at which the solar power system must be de-activated must exceed the temperature $T_S$ of the part or parts of the interior heat-transfer circuits where liquid from the exterior heat-transfer circuits is to be stored by a sufficient amount for the entire liquid portion of the heat-transfer fluid in the exterior circuits at de-activation—which does not drain into the interior heat-transfer circuits by gravity—to be vaporized before $T_{hA}^{(s)}$ falls to $T_S$, and thus stops the process of migration of the vaporized liquid to the interior heat-transfer circuits and the simultaneous process of condensation of this vaporized liquid in these circuits. The minimum value of $\{(T_{hA}^{(s)})_{min} - T_S\}$ for which this occurs can be determined for a given installation by tests, and the CCU can be provided with means for generating a signal whenever $\{(T_{hA}^{(s)}) - T_S\}$ falls below this minimum value. In designs where this minimum value is undesirably high, means can be provided to complete the aforementioned depletion of liquid in the exterior heat-transfer circuits before the saturated vapor temperature $T_{hA}^{(s)}$ falls to $T_S$ by enhancing the vaporization and the vapor migration rate from the exterior to the interior heat-transfer circuits. These means fall into the following two categories. The first category of means comprise means for cooling the part or parts of the interior heat-transfer circuits where liquid from the exterior heat-transfer circuits is to be stored after power system de-activation. For example, if the heat-transfer fluid is $H_2O$, and the lowest operating temperature of the fluid passages in collector and evaporator 1 is 100° C., water stored at the building ambient temperature, of say 25° C., could be circulated in tubes in contact with appropriate parts of the interior heat-transfer circuits including, say, reservoir 7 in FIGS. 1, 2, or 3. The initiation and termination of the flow of this cooling water would be controlled by signals supplied by the CCU. The second category of means comprise means for supplying additional heat to the exterior heat-transfer circuits to retard the time at which $T_{hA}^{(s)}$ falls to $T_S$. The supply of additional heat would be controlled by the CCU. A combination of both categories of means could also be employed. Independently of the means used to enhance the foregoing process of vaporization in the exterior heat-transfer circuits, and migration to and condensation in the interior heat-transfer circuits, many control methods can be employed by the CCU for terminating the foregoing enhancement. (This enhancement would usually be started upon de-activation of the solar power system.) I give two examples of typical control methods for terminating enhancement. The first method maintains $T_{hA}^{(s)}$ above $T_S$ by a given amount, and for a given time interval, after de-activation of the solar power system. The selection of this amount and time interval would be based on tests which showed that depletion of the liquid in the exterior heat-transfer circuits would be completed if $T_{hA}$ were maintained above $T_S$ by a specified amount and specified time interval after power system de-activation. The second method measures the liquid level of the heat-transfer fluid in the reservoir in which it is to be stored—which could be an oversized version of liquid reservoir 7 in FIGS. 1, 2, or 3—and terminates the enhancement means employed after this liquid level reaches a preselected value. This value would be based on tests that measured the liquid level attained in the foregoing reservoir when the exterior heat-transfer circuits contained no heat-transfer fluid in its liquid phase.

The purpose of the valves mentioned earlier is to prevent reverse migration of the liquid stored in the interior heat-transfer circuits to the exterior heat-transfer circuits, and especially to collector and evaporator 1. In the second of the two cases discussed earlier the valves should be kept open after solar system de-activation, by a signal supplied by the CCU, until $T_{hA}^{(s)}$ falls to $T_S$. At this time, this signal should be removed to allow the valves to close. In the first case, the valves should also be closed when $T_{hA}^{(s)}$ falls to $T_S$ in installations where no liquid is contained in the exterior heat-transfer circuits at this time. However, if some liquid is still left in the exterior heat-transfer circuits when $T_{hA}^{(s)}$ reaches $T_S$, the valves can be kept open until $T_{hA}^{(s)}$ approaches $T_h^{(s)}$ to allow the remaining liquid to be drained by gravity into the interior heat-transfer circuits. In the time interval after $T_{hA}^{(s)}$ reaches $T_S$ and before the valves close, heat will be transferred from the interior to the exterior heat-transfer circuits by vapor migration from the former to the latter, and by condensation in the latter. However, the condensed vapor will, in the circuit configuration belonging to the first case, be returned by gravity to the interior heat-transfer circuits and will thus not accumulate in the exterior heat-transfer circuits, and therefore the only penalty incurred will be some loss of heat from the power system to the environment.

The valves need not be leakproof as long as the leakage rate is low enough to prevent any segment of the fluid passages of collector and evaporator 1 from filling with condensed vapor before the temperature of these fluid passages falls below the triple point of the particular heat-transfer fluid employed, because below this point a vapor changes directly to a solid (without passing through the liquid phase) so that no destructive pressures can be generated with substances, such as water, which expand when they freeze.

I note that the valve which would be installed at exit 6 of heat exchanger 4 in FIG. 1 if one were used, or at the exit 46 of condenser 44 in FIGS. 2 and 3 if one were used, could also, in principle, be installed at entrance 5 of heat exchanger 4 in FIG. 1, and at the entrance 45 of condenser 44 in FIGS. 2 at 3. However, in two-phase heat-transfer systems, the location of valves in liquid lines is usually preferred to that in vapor lines because the former lines are, in general, much smaller that the latter, and consequently valves located in liquid lines are, in general, much less expensive than valves located in vapor lines.

Special unidirectional fluid valves exist which require a small back pressure to close, typically a fraction of an ounce, and which where compatible with the fluid used can provide a small enough leakage rate for them to be employed instead of say direct acting solenoid valves. In FIG. 1, such a unidirectional valve is placed in the liquid line between points 6 and 8 next to 6, or the vapor line between points 3 and 5 next to 5; in FIGS. 2 and 3, in the liquid line between 46 and 47 next to 46 or in vapor-line between 3 and 45 next to 45; and, in addition, in FIG. 3, in the liquid line between 56 and 58 next to 58. (These unidirectional valves are oriented so as to allow the fluid to flow in its normal direction of flow during system operation.) Unidirectional valves allow fail-safe protection against both high pressures and freezing if they are used with a normally-closed, for example solenoid, valve in the liquid line between points 2 and 12. This valve should be placed as near as possible to point 2 while still being located in the enclosure mentioned earlier, that is maintained at a temperature above $T_h(f)$. (The location of the valves in the other line segments is not critical provided they are placed within this enclosure.)

The use of unidirectional valves allows the liquid in collector and evaporator 1 to be depleted by the process of vapor migration and condensation if collector and evaporator 1 stagnates due to any cause, and thus fail-safe protection against high pressures is furnished, as discussed under the heading "SPECIFIC EMBODIMENT OF CLASS A SYSTEMS WITH CONDENSATE PUMP" in my co-pending application, Ser. No. 902, 950, even if the valve in the line between points 2 and 12 fails to open.

To avoid crowding FIGS. 1, 2, and 3, unidirectional valves are shown only in the vapor lines: valve 86 in FIGS. 2 and 3 and valve 87 in FIG. 3. The location of unidirectional valve 87 assumes that separator 79 and vapor line 80-45 are both located inside the enclosure mentioned earlier; namely, this location assumes that both this separator and this vapor line are part of the interior heat-transfer circuits. (Clearly, with this assumption, the two, two-way valves 83 and 85 in FIG. 3 could also be replaced by a single two-way valve located in the same position as valve 87, but not shown to avoid crowding FIG. 3.)

It should be obvious to those skilled in the art (in view of the teachings in the present specification and the teachings of my two earlier cited co-pending applications) that the methods and means disclosed in the present specification, for protecting the foregoing power system heat-transfer circuits against damage arising from solidification of the heat-transfer fluid used, apply also to the two-phase heat-transfer systems disclosed in my two earlier cited co-pending applications where the heat-transfer fluid absorbs all, or essentially all, heat by vaporization (evaporation) and releases all, or essentially all, heat by condensation.

It should also be obvious to those skilled in the art (in view of these same teachings), that the foregoing protection can also be provided by these same methods and means in the case of power systems whose (power-cycle) working fluid is heated and vaporized directly in the fluid passages of (the absorber of) a solar collector.

Figure 4:
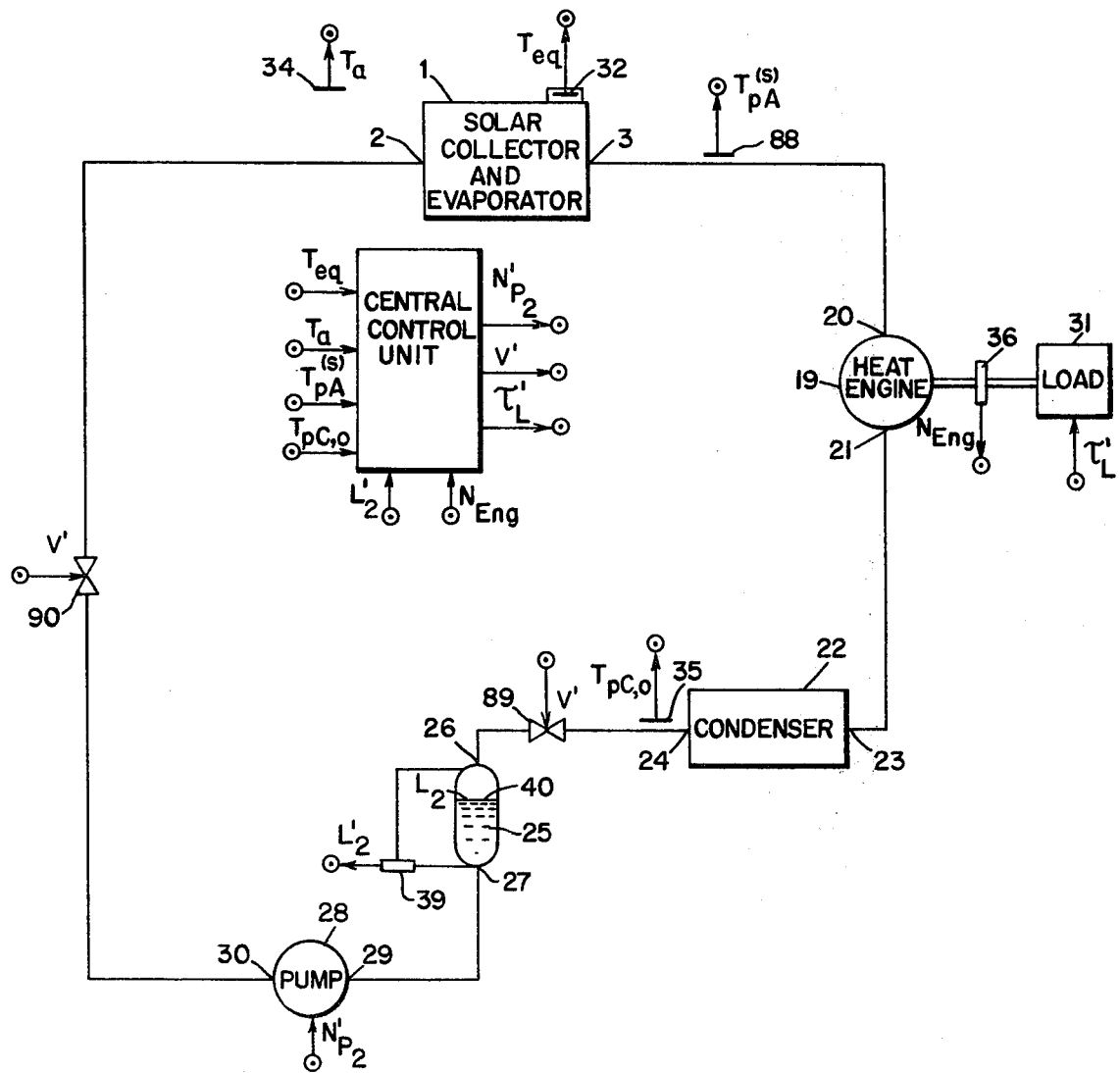
FIG. 4 illustrates in diagramatic form a typical embodiment of the invention where no separate heat-transfer fluid is employed to absorb solar radiant heat and to preheat and vaporize the power cycle fluid, and where the power cycle fluid is instead preheated and vaporized directly by solar radiant heat in a solar collector.

FIG. 4 shows the case where—as in the specification of my co-pending application Ser. No. 457,271, now U.S. Pat. No. 4,211,207—no separate heat-transfer fluid circuit is used. In FIG. A, devices and points corresponding to those in FIG. 1 are designated by the same numbers. Transducer 88, which is used to measure the saturated vapor temperature $T_{pA}{}^{(s)}$ at a point between 3 and 20, can be the same kind of device as the one used to measure the saturated vapor temperature $T_{hA}{}^{(s)}$ of the heat-transfer fluid. Finally, valves 89 and 90 are used for the same purpose and can be the same type of valve as, say, valves 81 and 82 in FIG 1.

What is claim is:

1. A power system for driving a mechanically-driven device comprising a working fluid, whose thermodynamic state traverses a Rankine power cycle, in a working fluid circuit which includes:
   (a) means for heating and vaporizing a liquid portion of said working fluid entering said heating and vaporizing means;
   (b) a heat engine in which the vapor generated in said heating and vaporizing means is expanded, said engine being employed to drive said mechanically-driven device;
   (c) means for condensing said expanded vapor:
   (d) means for pumping said condensed vapor back to said heating and vaporizing means; and
   (e) means for controlling the temperature of vaporization of said working fluid by varying the torque presented to said engine by said mechanically-driven device, said temperature of vaporization being controlled to maximize a performance quantity related to the power delivered by said engine under the prevailing conditions external to said power system while supplying dry vapor to said engine.

2. A power system in accordance with claim 1 and including means for separating the vapor and liquid portions of said working fluid exiting said heating and vaporizing means, said vapor portion being supplied to said engine, and said liquid portion being returned to said fluid circuit at a point between said pumping means and said heating and vaporizing means.

3. A power system in accordance with claim 1 wherein said dry vapor is saturated.

4. A power system in accordance with claim 1 wherein said dry vapor is superheated by a preselected amount.

5. A power system in accordance with claim 1 wherein the said related performance quantity is the power delivered by said heat engine.

6. A power system in accordance with claim 1 wherein said related performance quantity is the power delivered by the device driven by the solar engine.

7. A power system in accordance with claim 1 wherein said related performance quantity is the power delivered by the system to which said driven device belongs.

8. A power system in accordance with claim 1 wherein said driven mechanical device is the compressor of a cooling system and said related performance quantity is the rate at which said system absorbs heat from a substance.

9. A power system in accordance with claim 1 wherein the means in which the liquid portion of said working fluid is heated and vaporized includes a means for absorbing radiant energy and transferring at least a portion of said radiant energy to said working fluid.

10. A power system in accordance with claim 9 wherein said means for absorbing said radiant energy includes a separate fluid circuit from the working fluid circuit with a separate second fluid from the working fluid to transfer heat from said means for absorbing radiant energy to said means for heating and vaporizing the liquid portion of said working fluid.

11. A power system in accordance with claim 10 wherein said second separate fluid remains in its liquid phase throughout said separate fluid circuit.

12. A power system in accordance with claim 10 wherein said second separate fluid absorbs heat, in said means for absorbing radiant energy, in part by evaporating the liquid portion of said second separate fluid, and releases heat to said working fluid, in said absorbing and vaporizing means, in part by condensing the vapor generated by evaporating said liquid.

13. A power system in accordance with claim 12 wherein the said second separate fluid, whenever the power system is not operating, is prevented from causing damage to said means for absorbing radiant energy even when the temperature of said means for absorbing solar radiant energy is below the temperature at which the liquid phase of said fluid freezes at the prevailing pressure.

14. A power system in accordance with claim 12 wherein the ratio of sensible to latent heat absorbed by said working fluid, at any given time during any steady-state condition, is essentially equal to the ratio of sensible to latent heat released by said second separate fluid.

15. In a power system, a method for driving a mechanically driven device using a working fluid whose thermodynamic state traverses a Rankine power cycle, comprising:
 (a) heating and vaporizing a liquid portion of said working fluid:
 (b) expanding said working fluid vapor in a heat engine which drives said mechanically driven device;
 (c) condensing said expanded vapor after leaving said engine and returning said liquid back for further heating and vaporizing; and
 (d) controlling the temperature of vaporization of said working fluid by varying the torque presented to said engine by said mechanically driven device.

16. A method in accordance with claim 15 wherein the heating and vaporizing of a liquid portion of said working fluid is achieved by transferring radiant energy absorbed by a second working fluid in a second working fluid circuit.

17. A method, in accordance with claim 15 or 16 wherein said torque is varied (so as) to maximize the power delivered by said engine to said mechanically-driven device under currently prevailing operating condisions.

18. A method, in accordance with claim 15 or 16, wherein said torque is varied (so as) to maximize the power delivered by said mechanically-driven device under currently prevailing operating conditions.

19. An improved power system for driving a load mechanically wherein the power system is of the type having a working fluid whose thermodynamic state traverses a Rankine power cycle and one or more working-fluid circuits, within which the working fluid circulates, which include:
 (a) means for absorbing heat from a source of heat and vaporizing liquid working fluid which includes one or more working fluid passages; said absorbing and vaporizing means being of the type wherein the rate at which heat is absorbed by the working fluid, in the one or more fluid passages of the absorbing and vaporizing means, depends significantly on the value of the difference between the temperature of vaporization of the working fluid and the equivalent temperature of the surroundings of the absorbing and vaporizing means;
 (b) a heat engine in which the vapor generated in the heat absorbing and vaporizing means is expanded, said heat engine being employed to drive the mechanically-driven load;
 (c) means for condensing said expanded vapor; and
 (d) means for pumping said condensed vapor back to the entrance of said absorbing and vaporizing means;
wherein the improvement comprises means for controlling the temperature of vaporization of the working fluid in the heat absorbing and vaporizing means by varying the load, and in particular the torque, presented to the heat engine by the mechanically-driven load, so as to maximize a performance quantity related to the power delivered by the heat engine under prevailing conditions external to the power system which at the same time supplying dry vapor to the heat engine; and wherein the control of said temperature of vaporization by said load, and in particular by said torque, is achieved through changes in rotational speed of the heat engine and in associated changes in mass flow rate of the working fluid.

20. A power system, in accordance with claim 19, wherein the mechanically-driven load includes a device driven mechanically by the heat engine and means for varying the ratio of the rotational speed of the device and the rotational speed of the heat engine; and wherein said load, and in particular said torque, is varied by changing the value of said ratio.

21. A power system, in accordance with claim 19, wherein the mechanically-driven load includes a device driven mechanically by the heat engine, an auxiliary source of mechanical power, means for varying the power, and in particular the torque, supplied by the auxiliary source of mechanical power, and means for also driving whenever appropriate the device with the auxiliary source of mechanical power so as to share with the heat engine the power, and in particular the torque, applied to the device; and wherein the load, and in particular the torque presented to the heat engine by the mechanically-driven load is varied by changing the power, and in particular the torque, supplied by the auxiliary source of mechanical power and applied to the device.

22. A power system, in accordance with claim 19, wherein the mechanically-driven load includes a first device driven mechanically by the heat engine, an auxiliary source of mechanical power, means for varying the power, and in particular the torque, supplied by the auxiliary source of mechanical power, a second device driven mechanically by the auxiliary source of mechanical power so as to share, with the first device, whenever appropriate, a common load; and wherein the load, and in particular the torque, presented to the heat engine by the mechanically-driven load is varied by changing the power, and in particular the torque, supplied by the auxiliary source of mechanical power and applied to the second device.

23. A power system, in accordance with claim 21, which includes means for varying the ratio of the rotational speed of the heat engine and the rotational speed of the device.

24. A power system, in accordance with claim 22, which includes means for varying the rotational speed of the heat engine and the rotational speed of the second device.

25. A power system, in accordance with claim 22, wherein the first device and the second device are compressors employed in a two-stage compounded refrigeration system.

26. A power system, in accordance with claim 21 or 22, wherein the auxiliary source of mechanical power is an electric motor.

27. A power system, in accordance with claim 19, 20, or 21, wherein said related performance quantity is the power delivered by the heat engine.

28. A power system, in accordance with claim 20 or 21, wherein said related performance quantity is the power delivered by the device.

29. A power system, in accordance with claim 22, wherein said related performance quantity is the power delivered by the first device.

30. A power system in accordance with claim 25 which includes means for matching a load driven by the device while at the same time maximizing said related performance quantity; and wherein said related performance quantity is the power delivered by the device.

31. A power system, in accordance with claim 26, which includes means for matching said common load while at the same time maximizing said related performance quantity; and wherein said related performance quantity is the power delivered by the second device.

32. A power system, in accordance with claim 19, wherein the value of a preselected internal operating parameter of the power system is used as a criterion for determining whether the value of said related performance quantity has attained the maximum achievable value of said related performance quantity under prevailing conditions external to the power system at any given time; and wherein the power system also includes:
 (a) means for determining the particular value of said preselected internal operating parameter for which the value of said related performance quantity would be a maximum under said prevailing external conditions;
 (b) means for determining, including directly measuring, the current value of said preselected internal operating parameter; and
 (c) means for comparing the current value of said preselected internal operating parameter with the particular value of said preselected internal operating parameter, and for controlling the load, and in particular the torque, presented to the heat engine by the mechanically-driven load so as to cause said current value to approach, and to remain close to, said particular value.

33. A power system, in accordance with claim 32, wherein said preselected internal operating parameter is the temperature of vaporization of the working fluid.

34. A power system, in accordance with claim 32, wherein said preselected internal operating parameter is the rotational speed of the heat engine.

35. A power system, in accordance with claim 32, wherein said preselected internal operating parameter is the power developed by the heat engine.

36. A power system, in accordance with claim 32, wherein the means for determining said particular value include means for measuring one or more parameters chosen to characterize conditions external to the power system, and means for computing the value of said particular value as a function of said chosen parameters.

37. A power system, in accordance with claim 36, wherein the mechanically-driven load is a compressor of a refrigeration system having a refrigerant which absorbs heat from the substance being cooled at least in part by evaporation, and rejects heat to a heat sink at least in part by condensation; and wherein the one or more parameters chosen to characterize conditions external to the power system include a measure of the pressure, and in particular the temperature, at which the refrigerant absorbs heat from the substance by evaporation, and a measure of the pressure, including the temperature, at which the refrigerant rejects heat to the heat sink by condensation.

38. A power system, in accordance with claim 19, wherein said absorbing and vaporizing means also includes a heat-transfer fluid circulating in a heat-transfer fluid circuit; wherein said heat-transfer fluid circuit is separate and distinct from the working-fluid circuit; and wherein said heat transfer fluid is employed to absorb heat from the source of heat and to release the absorbed heat to the working fluid.

39. A power system, in accordance with claim 38, wherein the phase of at least a portion of the heat-transfer fluid alternates between the liquid phase and the vapor phase as the heat-transfer fluid circulates in the heat-transfer fluid circuit.

40. A power system, in accordance with claim 19 or 38, wherein the source of heat is radiant energy, including solar radiant energy.

41. A power system, in accordance with claim 36, wherein the heat source emits radiant energy, including solar radiant energy; wherein said absorbing and vaporizing means includes means for controlling the radiant energy, including the solar radiant energy, and for transferring at least a portion of the collected energy to the working fluid; and wherein the one or more parameters selected to characterize conditions external to the power system include a measure of the intensity of the collected radiant energy, and a measure of the equivalent temperature, incuding the air temperature, of the outdoor surroundings of said collecting and transferring means.

* * * * *